Aug. 13, 1940.   H. E. BALSIGER ET AL   2,211,530
GRINDING WHEEL FEEDING MECHANISM
Filed March 16, 1938   3 Sheets-Sheet 1
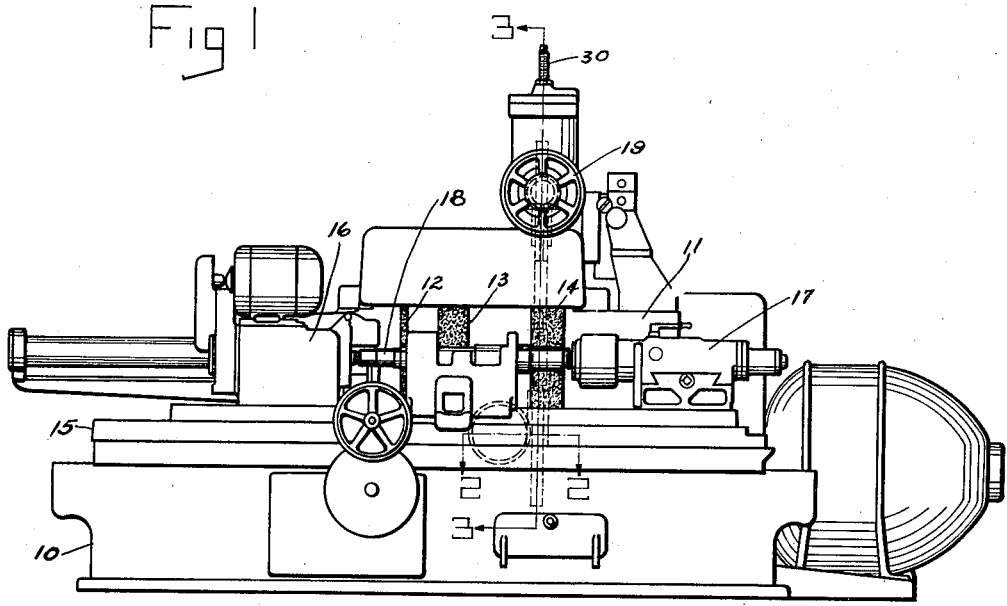
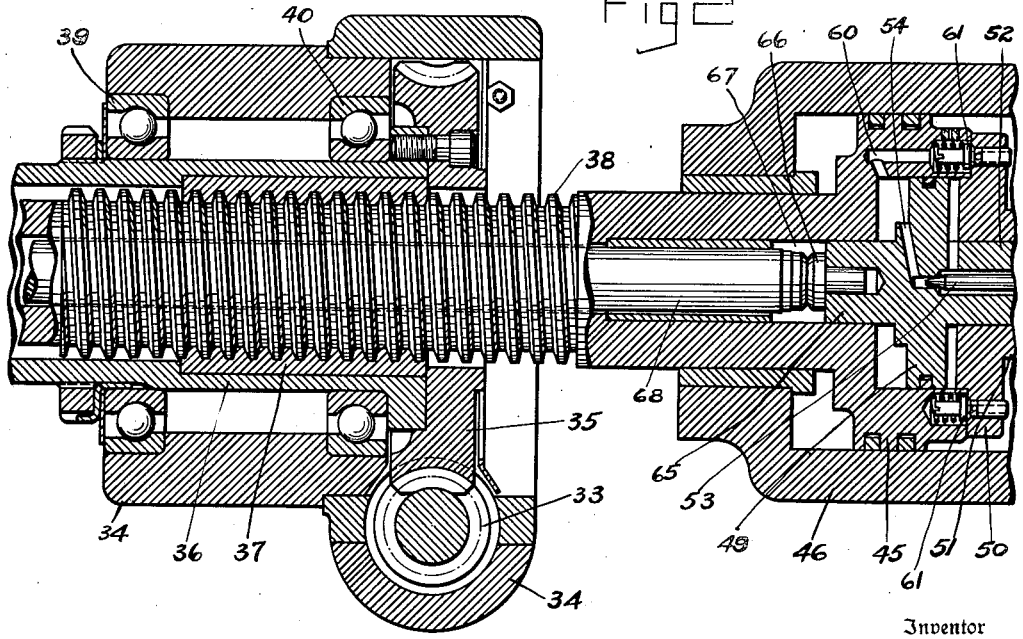
Inventor
HAROLD E. BALSIGER
RALPH E. PRICE

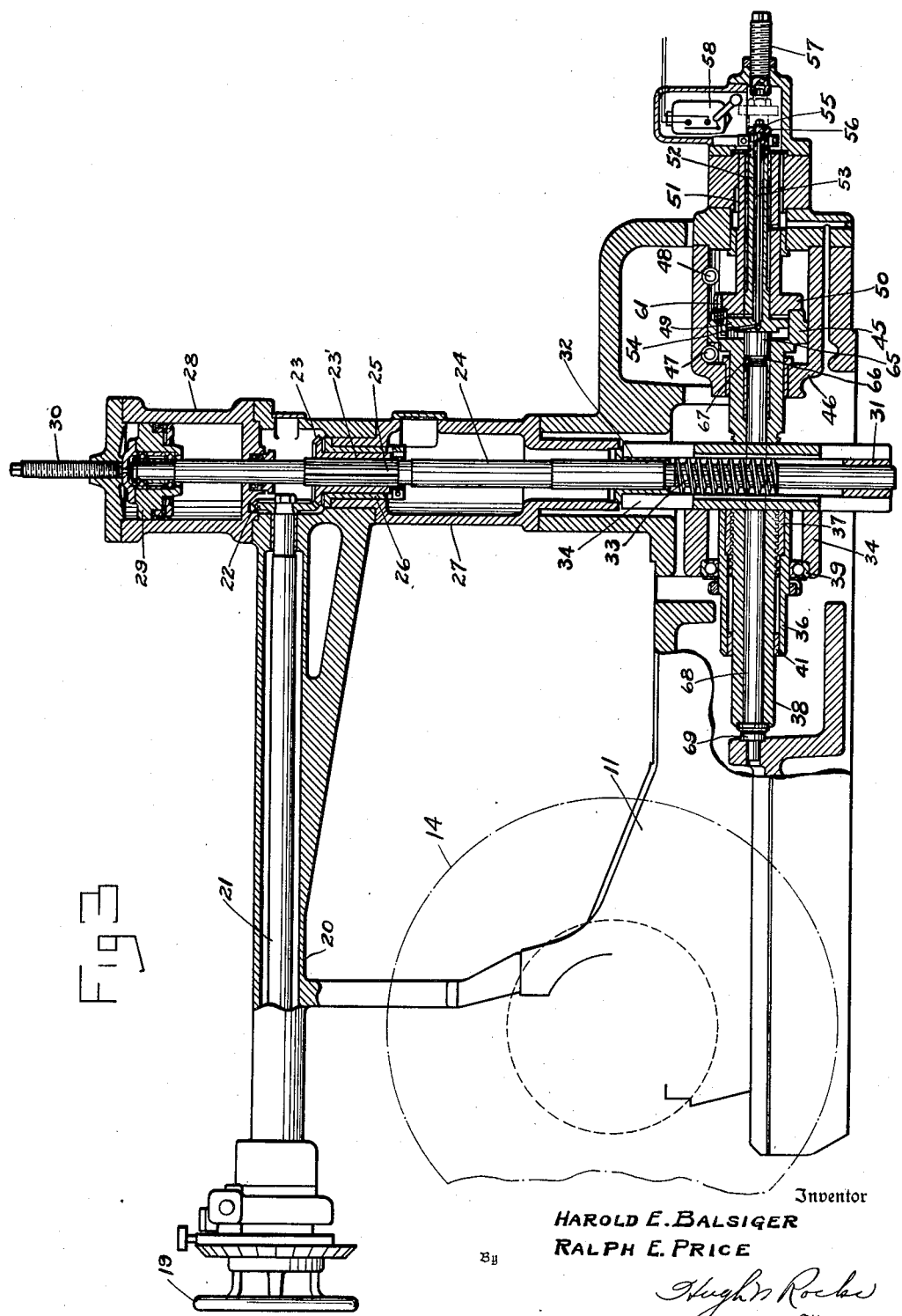

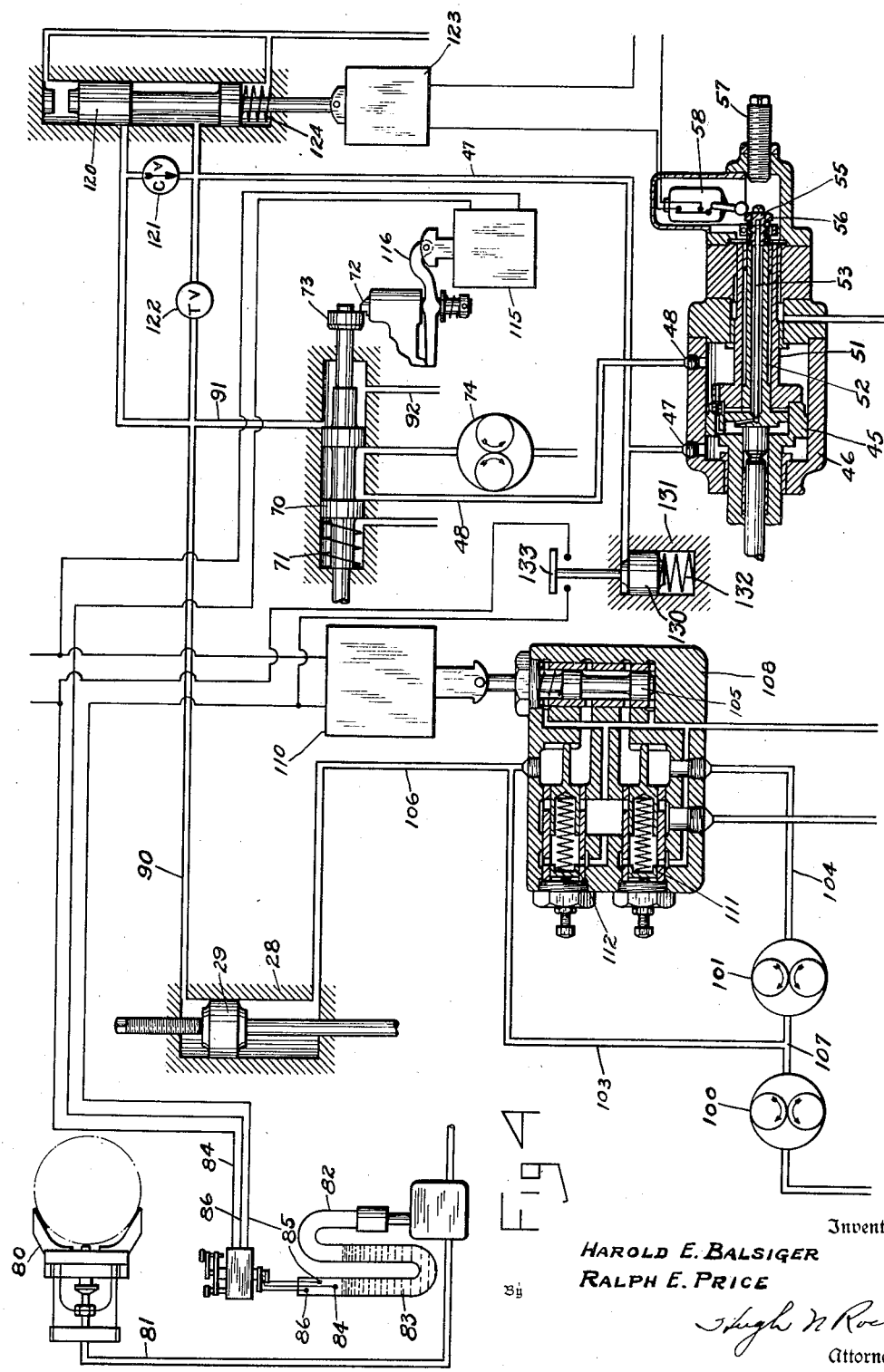

Patented Aug. 13, 1940

2,211,530

UNITED STATES PATENT OFFICE 2,211,530

GRINDING WHEEL FEEDING MECHANISM

Harold E. Balsiger and Ralph E. Price, Waynesboro, Pa., assignors to Landis Tool Company, Waynesboro, Pa.

Application March 16, 1938, Serial No. 196,254

5 Claims. (Cl. 51—105)

Our invention relates to wheel feeding mechanisms for grinding machines, and it is an object of same to provide a single mechanism combining power means for effecting a rapid feed or positioning movement of the grinding wheel, power means for effecting a slow or grinding feed movement and manually operated means for adjusting the position of the wheel support.

It is a further object to provide automatic means for controlling the power operated mechanisms.

It is a further object to provide means for cushioning the rapid feed mechanism as it approaches the end of its movement.

A further object is to control size of several axially spaced portions of varying diameters on a work piece from a single sizing device.

In the drawings:

Figure 1 is a front elevation of a grinding machine to which our feed mechanism is applied.

Figure 2 is a cross section of a portion of our invention taken on the line 2—2 of Figure 1.

Figure 3 is a sectional view of the entire feed mechanism along the lines 2—2 and 3—3 of Figure 1.

Figure 4 is a piping and wiring diagram showing the relation between the various operating elements and the control elements.

The present invention is a development of two types of feed mechanisms, one shown in Steiner Patent 1,945,453 granted January 30, 1934, the other shown in the co-pending application of Price, Balsiger and Ott, Serial No. 94,704 filed August 6, 1936.

The patent shows a piston motor and a dash pot for effecting axial movement of a handwheel shaft upon which is mounted a worm gear meshing with a worm wheel on a vertical shaft. All of these parts are on the wheel base. The other end of the vertical shaft carries a pinion meshing with a rack on the bed of a grinding machine. When the shaft is moved axially the worm gear acts as a rack and provides a rapid feed thru a short distance, (less than an inch) and the dash pot checks this rapid movement and reduces it to a grinding feed for an even shorter distance. This type of feed is not fitted for positioning movements of three or four inches.

The application 94,704 shows a piston type motor for shifting a feed screw axially for a rapid positioning movement, a second piston for rotating the feed screw for a grinding feed after the positioning movement has been halted by engaging a positive stop and a hand wheel mechanism for rotating a nut on a second feed screw in axial alignment with the first screw.

Our invention consists essentially of a feed screw which is shifted axially by means of a hydraulic piston type motor. A nut on the screw is rotatably attached to the wheel support. The axial movement of the screw thus moves the nut and the wheel support to position a grinding wheel adjacent a work piece for grinding same. The nut may be rotated for a grinding feed by another piston which shifts a worm gear axially to rotate a worm wheel in mesh with said gear. The worm wheel is attached to the nut for rotating same. The position of the grinding wheel may be adjusted manually by means of a hand wheel which is connected to rotate said worm gear and hence said worm and nut. The nut is the central portion of the mechanism since the movement of each of the other members is transmitted thru it to the wheel base.

In Figure 1, numeral 10 indicates the bed of a grinding machine; 11 a wheel base slidably mounted thereon, and 12, 13 and 14 grinding wheels rotatably mounted on said wheel base. A work table 15 has mounted thereon a headstock 16 and a footstock 17 for supporting a work piece 18 having a plurality of spaced portions thereon to be ground. Said portions are of varying diameters, and the wheels 12, 13 and 14 must therefore have correspondingly varying diameters.

The mechanism for moving the grinding wheels toward and away from the work consists of a hand wheel 19 mounted on a bracket 20 through which extends a handwheel shaft 21. The end of said shaft opposite the handwheel carries a bevel gear 22 which engages another bevel gear 23 on shaft 24. Said bevel gear 23 is formed on one end of a sleeve 23' the inside of which is splined to receive a splined portion 25 on said shaft 24. Said sleeve 23' and bevel gear 23 are rotatably mounted in a bushing 26 in the casing 27. One end of said shaft 24 extends into a cylinder 28 and has a piston 29 mounted thereon. A screw 30 in the head of said cylinder serves to determine the extent of movement of piston 29 therein.

Said shaft extends in the opposite direction into the wheel support 11. The extreme end of said shaft is supported in a bushing 31. Spaced from said bushing is a second bushing 32. Between said bushings a worm 33 is mounted on said shaft. Said worm and bushings are enclosed in a casing 34. Said casing is attached to the wheel support and has mounted thereon in addition to worm 33, a wormgear 35 meshing with said worm. In axial alignment with wormgear 35 and secured thereto is a sleeve 36 and pressed into said sleeve is a second sleeve 37 having an internal thread for meshing with a feed screw 38. Said sleeve 36 is supported in said housing 34 on bearings 39 and 40 and extends far enough forward to take care of the extreme position of the threaded portion of the feed screw in that direction. The forward end of said sleeve is supported on said screw by a bushing 41.

The rearward end of said screw is in the form of a piston 45 in a cylinder 46. Fluid under pressure from a suitable source may be introduced into either end of said cylinder through ports 47 and 48. Inside piston 45 is a cylindrical recess in which is mounted another piston 49. Said recess is closed by a cap 50 which forms a part of piston 45 and which has a tubular portion 51 extending rearwardly and forming a tail rod for said piston. Piston 49 also has a tail portion 52 concentric with that of piston 45. The purpose of this portion on piston 49 is to house a needle valve element 53. Piston 49 has a passage 54 therethru for permitting fluid to pass from one side to the other thereof.

Valve 53 is seated in said passage and may be adjusted to regulate the rate of passage of fluid therethru. One or more passages 60 in piston 45 permit passage of fluid from cylinder 46 into the recess in said piston. Check valves 61 prevent movement of fluid in the opposite direction. Valve 53 is secured to a threaded bushing 55 in tail rod 52. Said bushing has a head shaped for receiving a wrench or other suitable tool for turning same. A lock nut 56 serves to maintain any adjustment of said bushing and valve. A stop screw 57 determines the limit of the rearward movement of piston 45 and hence of the wheel support 11. A limit switch 58 is mounted with its roller in position to be shifted by movement of tail rod 52. The purpose of said limit switch will be described later.

The head end of a piston 49 has a projecting portion 65 into which is inserted a hardened stop 66. Said projecting portion slides in the bore 67 in feed screw 38.

A stop rod or bar 68 having a headed forward end is slidably mounted in said bore 67. A hardened stop 69 is mounted in the bed and located in the path of rod 68 for determining the forward limit of the rapid feed movement of wheel support 11 and grinding wheel 14 mounted thereon.

A sizing device of the type disclosed in Balsiger Patent 2,001,447 granted May 14, 1935, controls the grinding operation. Said sizing device consists of a caliper 80 for engaging one of the portions of work piece 19. The size of the other portions is determined from this one. Air is supplied to said caliper through a line 81 into which is connected a manometer tube 82 having a body of electrically conductive fluid 83 movable in response to change in flow and pressure of air supply. In one end of said tube are inserted three electrical contact members, 84, 85 and 86. Member 85 determines the end of the rough grinding operation. Member 86 determines the end of the finish grinding operation. Member 84 is common to each of the others.

Operation

To start the rapid feed movement the operator shifts valve 70 to the left against the action of spring 71. A latch 72 engages a collar 73 on the stem of valve 70 and holds said valve in shifted position. In this position fluid under pressure from pump 74 is permitted to pass through said valve to line 48 and into the right-hand end of cylinder 46 to move piston 45 and wheel support 11 rapidly to a position for wheels 12, 13 and 14 to start grinding selected portions of a work piece 18.

During the rapid feed movement switch 58 is released at a point which may be adjusted, to energize solenoid 123 and shift valve 120 to close the by-pass around check valve 121. Exhaust fluid from the front end of cylinder 46 must then pass through throttle valve 122. The exhaust fluid being restricted, the rapid feed movement is slowed down. The purpose of this slow down is to grind the cheeks or shoulders formed at one or both ends of the portion being ground.

When valve 70 is shifted as above described, lines 90 and 91 connected to the upper end of cylinder 28 are opened to exhaust passage 92. Fluid under a lower pressure than that of pump 74 is supplied to the other end of cylinder 28 by pumps 100 and 101 through lines 103, 104, valve 105 and line 106. Said pumps are in operation simultaneously with pump 74 but are effective to move piston 29 only when the pressure of pump 74 has been relieved such as by exhausting same. Pump 100 has a slightly larger capacity than pump 101. Said pumps are connected in series to valve 105, but line 103 which by-passes said valve is connected to the line 107 joining the two pumps. The volume of fluid passing through line 103 is equal to the capacity of pump 100 minus the capacity of pump 101. Pump 101 pumps the greater part of the discharge of pump 100 through valve 105 in housing 108. When said valve is in the position shown in Figure 4, the discharge from pump 101 passes through line 104 and valve 105 and then rejoins line 103 to form line 106. During the rapid feed movement and slow down for shoulder grinding, the exhaust pressure in line 47 is sufficient to depress piston 130 in cylinder 131 against spring 132 to close switch 133 and complete a circuit to solenoid 119 which is parallel to the sizing device circuit to said solenoid which will be described later. The function of solenoid 110 as will be described, is to reduce the rate of grinding feed. The reason for energizing said solenoid during the rapid feed movement is to delay the operation of the grinding feed piston 29 at a rough grinding rate until the rapid feed movement has been completed. At the end of the rapid feed movement, the pressure in line 47 drops and spring 132 shifts piston 130 to open switch 133 and deenergize solenoid 119.

Piston 29 moves upwardly and this movement is transmitted through worm 33, worm gear 35 and nut 37. Said nut being mounted in fixed relation to the wheel support and the screw 38 being mounted in fixed relation to the bed of the machine, the nut must travel along the screw carrying with it the wheel support at a speed suitable for rough grinding. At the completion of the rough grinding operation as determined by the sizing device, a circuit is completed thru line 85 to solenoid 110 which shifts valve 105 upwardly thus cutting off the passage of fluid from pump 101 through to line 106. Fluid from said pump is then discharged to the reservoir through a relief valve 111. A second relief valve 112 serves to maintain pressure of the remaining fluid from pump 100 which continues to flow to cylinder 28. Since all but a very small part of the discharge from pump 100 is taken by pump 101 and returned to the reservoir, the small remaining volume is unable to move piston 29 at any but a very slow speed. This slow movement, when transmitted through the above described feed mechanism, produces a feed movement of the grinding wheel which is very desirable for finish grinding.

When the desired size is reached a circuit is closed through contact 85 and line 86 to energize solenoid 115. Said solenoid 115 actuates a lever 116 which is so pivoted that an intermediate portion thereof engages a collar on latch 72 and withdraws said latch from holding engagement with collar 73. Spring 71 may then shift valve 70 to the right to connect passage 48 to cylinder 46 with an exhaust passage. Pump 74 is connected through lines 90 and 91 to the upper end of cylinder 28 to move piston 29 against the small volume of fluid under pressure supplied to the lower end of cylinder 28 for the finish grinding speed.

In this position of valve 70 fluid is also directed to the front end of cylinder 46 through line 47, by-pass valve 120 or check valve 121 or throttle valve 122. Valve 120 is held in the position shown, by a solenoid 123 against spring 124. Upon reverse movement of piston 45, tail rod 52 opens switch 58 and deenergizes solenoid 123. Spring 124 then shifts valve 120 to its uppermost position to open the by-pass around check valve 121.

We claim:

1. In a feeding mechanism for a grinding machine, a wheel support, hydraulic means comprising a piston and cylinder for effecting a rapid positioning movement of said wheel support, means for cushioning said movement comprising a piston movably mounted within said first mentioned piston, means for stopping said second piston before said first piston reaches the end of its stroke and adjustable means for retarding further movement of said first piston.

2. A grinding machine having a grinding wheel and a support therefor, a work support, means for effecting transverse movement of said wheel support including a screw and nut, means for effecting a rapid axial movement of said screw and nut to position said wheel for a grinding operation, a worm wheel on said nut, a worm in mesh therewith, power means for moving said worm axially whereby to rotate said nut for effecting a grinding feed, and means for rotating said worm for adjusting the zone of said grinding feed.

3. A grinding machine including a work support, a tool support, a screw and nut mechanism for effecting a feeding movement of said support, power means for shifting said screw and nut axially for a rapid positioning movement, power means for rotating said nut on said screw whereby to provide a grinding feed movement, and rotatable, manually actuated means operable thru said second power means for rotating said nut whereby to adjust the zone of movement for said grinding feed.

4. A grinding machine including a work support, a tool support, a screw and nut mechanism for effecting a feeding movement of one of said supports toward the other, power means for shifting said screw and nut axially for a rapid positioning movement, power means for effecting relative rotation between said nut and said screw whereby to provide a grinding feed movement, and rotatable, manually actuated means operable thru said second power means for effecting relative rotation between said screw and nut whereby to adjust the zone of movement for said grinding feed.

5. A grinding machine having a grinding wheel and a support therefor, a work support, means for effecting transverse movement of said wheel support including a screw and nut, means for effecting a rapid axial movement of said screw and nut to position said wheel for a grinding operation, a worm wheel on one of said parts, a worm in mesh therewith, power means for moving said worm axially whereby to rotate said part for effecting a grinding feed, and means for rotating said worm for adjusting the zone of said grinding feed.

HAROLD E. BALSIGER.
RALPH E. PRICE.